US009025937B1

(12) United States Patent
Congedo et al.

(10) Patent No.: US 9,025,937 B1
(45) Date of Patent: May 5, 2015

(54) SYNCHRONOUS FUSION OF VIDEO AND NUMERICAL DATA

(71) Applicants: Peter D. Congedo, Clarksville, MD (US); David J. Fry, North Potomac, MD (US); Calvin D. Krishen, Washington, DC (US)

(72) Inventors: Peter D. Congedo, Clarksville, MD (US); David J. Fry, North Potomac, MD (US); Calvin D. Krishen, Washington, DC (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 137 days.

(21) Appl. No.: 13/662,172

(22) Filed: Oct. 26, 2012

Related U.S. Application Data

(60) Provisional application No. 61/555,077, filed on Nov. 3, 2011, provisional application No. 61/619,645, filed on Apr. 3, 2012.

(51) Int. Cl.
*H04N 5/93* (2006.01)
*G11B 27/034* (2006.01)
*G11B 27/036* (2006.01)

(52) U.S. Cl.
CPC ............ *G11B 27/034* (2013.01); *G11B 27/036* (2013.01)

(58) Field of Classification Search
CPC .... G11B 2220/61; G11B 27/029; G06F 8/38; G06F 3/01; G06F 8/33; G06K 9/33
USPC ........... 386/280, 286, 282; 717/110; 382/309; 715/762
See application file for complete search history.

(56) References Cited

U.S. PATENT DOCUMENTS

| | | | |
|---|---|---|---|
| 6,088,045 A | 7/2000 | Lumelsky et al. | |
| 7,162,502 B2 | 1/2007 | Suarez et al. | |
| 2002/0041757 A1* | 4/2002 | Takahashi | 386/95 |
| 2009/0307207 A1* | 12/2009 | Murray | 707/5 |
| 2012/0105279 A1* | 5/2012 | Brown et al. | 342/357.24 |
| 2012/0224077 A1* | 9/2012 | Imai et al. | 348/222.1 |
| 2012/0246559 A1* | 9/2012 | DeRoller et al. | 715/239 |
| 2013/0036363 A1* | 2/2013 | Johnson | 715/738 |
| 2013/0127875 A1* | 5/2013 | Blas et al. | 345/473 |
| 2014/0193083 A1* | 7/2014 | Marks | 382/218 |

OTHER PUBLICATIONS

Home page, Microsys Technologies Inc. website, http://www/microsys.com, 2011 (2 pages printed out on Oct. 31, 2011).

(Continued)

*Primary Examiner* — Helen Shibru
(74) *Attorney, Agent, or Firm* — Howard Kaiser

(57) ABSTRACT

According to typical practice of the present invention, temporal identifiers are simultaneously associated with (i) video and (ii) numerical data while these data are contemporaneously collected by, respectively, (i) a video camera filming an event and (ii) a data acquisition system acquiring numerical data from sensor(s) obtaining sensory information relating to the event. Various modes of inventive practice provide for time codes and/or markers as the temporal identifiers. The video and the numerical data are each converted to a digital form that furthers their mutual compatibility, the video to a compressed/encoded video file, the numerical data to an Adobe XMP data file. The compressed/encoded video file and the XMP data file are merged whereby the temporal identifiers are aligned with each other. The merged video file has numerical data embedded therein and is displayable so that the video and the numerical data are synchronized in comportment with actual real-time occurrence.

20 Claims, 12 Drawing Sheets

(56) References Cited

OTHER PUBLICATIONS

"PowerPlay Analysis Software," Microsys Technologies Inc. website, http://www/micro-sys.com/products/powerplay.htm, 2011 (2 pages printed out on Oct. 31, 2011).

"PowerPlay Feature List," Microsys Technologies Inc. website, http://www/micro-sys.com/products/pp_features.htm, 2011 (3 pages printed out on Oct. 31, 2011).

"PowerPlay Multi-Window AVI Option," Microsys Technologies Inc. website, http://www/micro-sys.com/products/ppmulti.htm, 2011 (2 pages printed out on Oct. 31, 2011).

"PowerPlay Crash Analysis Toolkit," Microsys Technologies Inc. website, http://www/micro-sys.com/products/ppcat.htm, 2011 (3 pages printed out on Oct. 31, 2011).

"PowerPlay Limited Edition Viewing Software," Microsys Technologies Inc. website, http://www/micro-sys.com/products/pple, 2011 (2 pages printed out on Oct. 31, 2011).

"PowerPlay.NET," Microsys Technologies Inc. website, http://www/micro-sys.com/products/ppnet.htm, 2011 (2 pages printed out on Oct. 31, 2011).

"PowerPlay Analysis Software," Microsys Technologies Inc. brochure, Oct. 2010 (2 pages, accessed via Microsys Technologies Inc. website, www/micro-sys.com).

"Wireless Sync Trigger System Manual," Product Manual, P-2388 Rev B, Noraxon EMG & Sensor Systems, Noraxon U.S.A. Inc., Scottsdale, Arizona, 2005 (13 pages, accessed via Noraxon U.S.A. Inc. website, www.noraxon.com).

Wireless Sync Trigger System Manual, Product Manual, P-2388 Rev D (Jun. 6, 2011), Noraxon EMG & Sensor Systems, Noraxon U.S.A. Inc., Scottsdale, Arizona, 2009 (14 pages, accessed via Noraxon U.S.A. Inc. website, www.noraxon.com).

Compact Wireless Sync System Manual, Product Manual, P-2398 Rev C, (Jun. 6, 2011), Noraxon EMG & Sensor Systems, Noraxon U.S.A. Inc., Scottsdale, Arizona, 2009 (13 pages, accessed via Noraxon U.S.A. Inc. website, www.noraxon.com).

\* cited by examiner

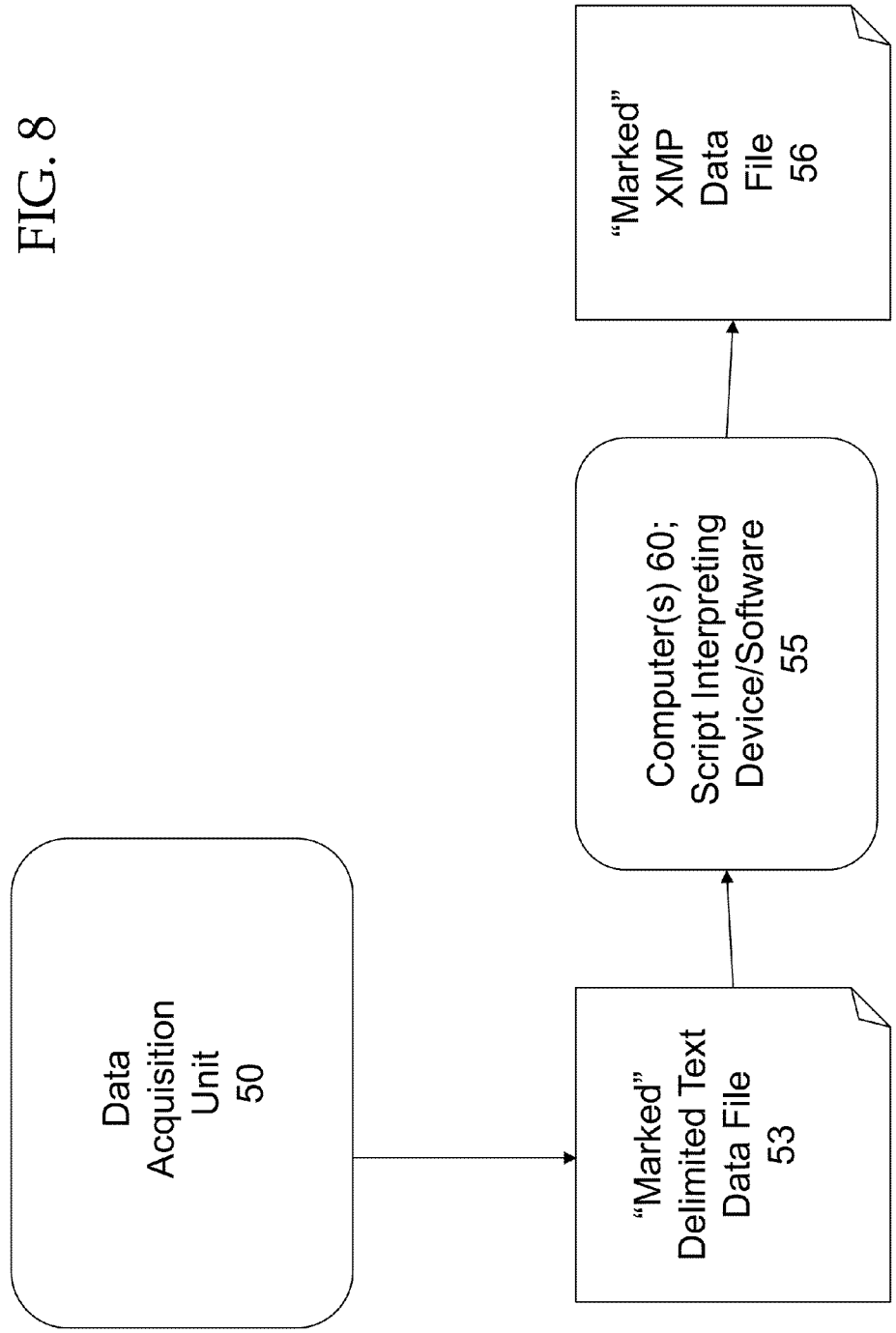

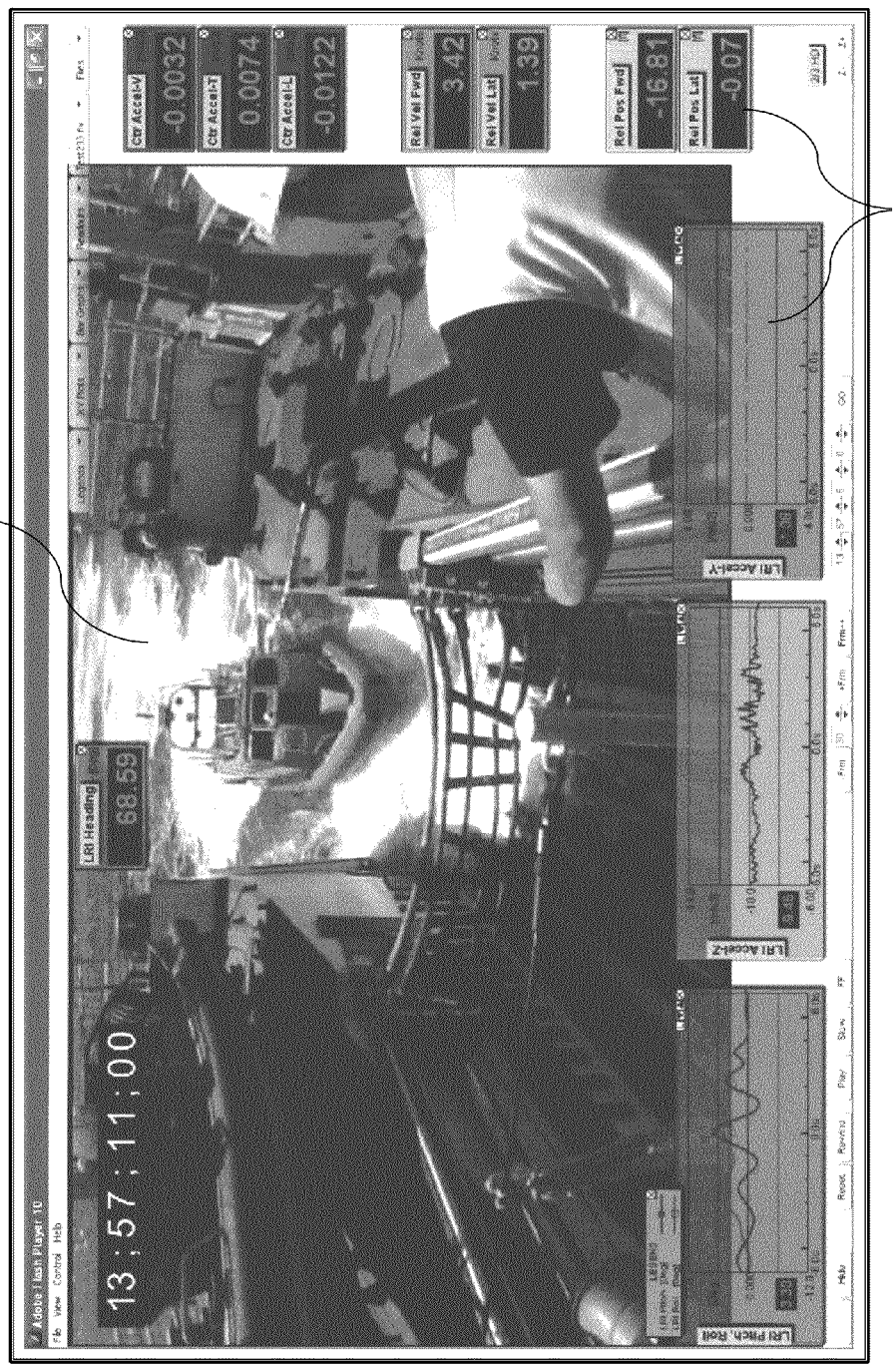

SYNCHRONOUS FUSION OF VIDEO AND NUMERICAL DATA

CROSS-REFERENCE TO RELATED APPLICATIONS

This application claims the benefit of U.S. provisional application Ser. No. 61/555,077, incorporated herein by reference, filing date 3 Nov. 2011, title "Synchronous Fusion of Video and Numerical Data," inventors Peter D. Congedo, David J. Fry, and Calvin D. Krishen. This application also claims the benefit of U.S. provisional application Ser. No. 61/619,645, incorporated herein by reference, filing date 3 Apr. 2012, title "Synchronous Fusion of Video and Numerical Data," inventors Peter D. Congedo, David J. Fry, and Calvin D. Krishen.

BACKGROUND OF THE INVENTION

The present invention relates to data fusion, more particularly to methods and systems for creating visual information (e.g., a visual data file) containing video data and numerical data that are displayable in a synchronous manner.

The creation of a video file combining video and numerical data has traditionally been a time-consuming and expensive process. A common approach has been to animate data displays frame-by-frame using a computer program with data-plotting features. The appropriately named sequence of data images would then be imported into video-editing software, which would manipulate the data sequence along with a camera-generated video file. Many efforts along these lines have had unique features carrying additional costs. Generally speaking, commercially available video-editing software offers very limited choices on how to structure the display; subsequent to output from the video-editing software, the video is fixed with no further customization possible.

Microsys Technologies Inc.'s PowerPlay analysis software permits access to synchronized data and video, and has been used in high-speed crash test analysis. PowerPlay displays data and video in separate windows, and permits synchronized playback of video data and sensor data so as to be displayed in practically any number of video windows and sensor windows. PowerPlay can create a multi-window single AVI file that combines one or more video windows with one or more sensor graph windows. Audio Video Interleave (AVI) is a multimedia container format that was introduced by Microsoft in 1992. AVI files are capable of containing both audio and video data in a file container permitting synchronous audio-video playback. Microsys Technologies Inc.'s PowerPlay AVI file is a container that permits display of rendered video. However, once the AVI file is created, the AVI file permits neither interaction therewith nor customization of the numerical data renderings nor reconfiguration of the overall display.

Hardware-based data inserters have been used in sports broadcasting. For instance, television broadcasts of racecar events have implemented techniques superimposing data values and related graphics over various camera feeds. The superposition is performed via hardware, marrying together various feeds. The viewer has no control over the data and data format.

In various scientific and engineering pursuits, analysis teams may require synchronous-display desktop access to high definition (HD) test video and data measurement channels. For instance, hydrodynamic facility tests such as performed by the United States Navy often produce large quantities of two kinds of data, viz., high definition video from observing cameras, and numerical data taken from multiple sensors. The video is usually not reviewed thoroughly until weeks after the test. Additional difficulties and costs are associated with adding data displays to the video. Therefore, projects frequently cannot afford to put synchronized views of high definition video and data in front of the test analysis scientists and engineers who need them.

SUMMARY OF THE INVENTION

In view of the foregoing, it is an object of the present invention to provide an improved methodology for synchronously displaying video data and numerical (quantitative) data. The terms "numerical data" and "quantitative data" are used interchangeably herein to broadly refer to anything that is, or can be, expressed as a quantity or number.

As typically embodied, the present invention succeeds in synchronously fusing video data and numerical data. Video data and numerical data are collected. The video data is collected using a video camera or like device. The numerical data is collected using a data acquisition device receiving information from one or more sensors. The collecting includes simultaneously associating a video temporal identifier with the video data and a data temporal identifier with the numerical data. The simultaneous association is performed during concurrent collection of the video data and the numerical data. The video data is converted to an encoded video file, the encoded video file having the video temporal identifier associated therewith. The numerical data is converted to a data markup language file such as an Adobe's Extensible Metadata Platform (XMP) file, the data markup language file (e.g., XMP file) having the data temporal identifier associated therewith. The encoded video file and the XMP data file are merged. The merger includes aligning the video temporal identifier (associated with the encoded video file) and the data temporal identifier (associated with the XMP data file). The merger results in a fused data file characterized by synchronicity of the video data and the numerical data. According to a mode "A" of inventive practice, the temporal identifiers are time codes. According to a mode "B" of inventive practice, the temporal identifiers are markers.

Typical practice of the present invention provides a software-tools-based methodology for digitally creating and flexibly displaying a single file containing video fused with data synchronized therewith. The present invention typically features, inter alia, the creation of a single computer file containing both (i) HD video and (ii) numerical data channels, wherein timing information is implemented in the creation to insure synchronization of the video and the numerical data in the computer file. As frequently embodied, the present invention displays a fused file (containing data and video) via a software player that permits extensive user customization of the display. A viewer application permits diversely customizable displays of synchronized HD video and numerical data.

Because the present invention fuses data and video into a single file, the present invention eliminates the difficult task of synchronizing multiple sources of information. Inventive software can be relatively small in size because for most basic operations it lends itself to use of low-memory facilities such as Adobe's Flash Player. A typical inventive application is fully compatible with the latest industry standard video compression standard (H.264) inside a Flash Player "wrapper." The present invention can efficiently and affordably provide synchronized views of high definition video and data for the benefit of test scientists/engineers, and can record such information for display in near real-time, or for display anytime.

Other objects, advantages, and features of the present invention will become apparent from the following detailed description of the present invention when considered in conjunction with the accompanying drawings.

BRIEF DESCRIPTION OF THE DRAWINGS

The present invention will now be described, by way of example, with reference to the accompanying drawings, wherein:

FIG. 2 illustrates what is referred to herein as inventive mode "A" synchronization, according to which the synchronization is effected via alignment of one or more video time codes and one or more data time codes.

FIG. 3 illustrates what is referred to herein as inventive mode "B" synchronization, according to which the synchronization is effected via alignment of one or more video markers and one or more data markers.

FIG. 4 depicts a video marker in the form of an "X"-impression of a video frame. FIG. 5 depicts a video marker in the form of brightening of a video frame. FIG. 6 depicts a video marker in the form of a blank video frame interposed between two video frames.

FIG. 8 is a schematic of typical inventive practice of the modification of a marked numerical data file, output by a data acquisition system, to a marked numerical file suitable for inventive union with a marked video file.

FIG. 14 is a screenshot of an example, in accordance with the present invention, of a data-embedded video file, i.e., a data file uniting video data and numerical data.

DESCRIPTION OF EXEMPLARY
EMBODIMENTS OF THE INVENTION

Figure 1:
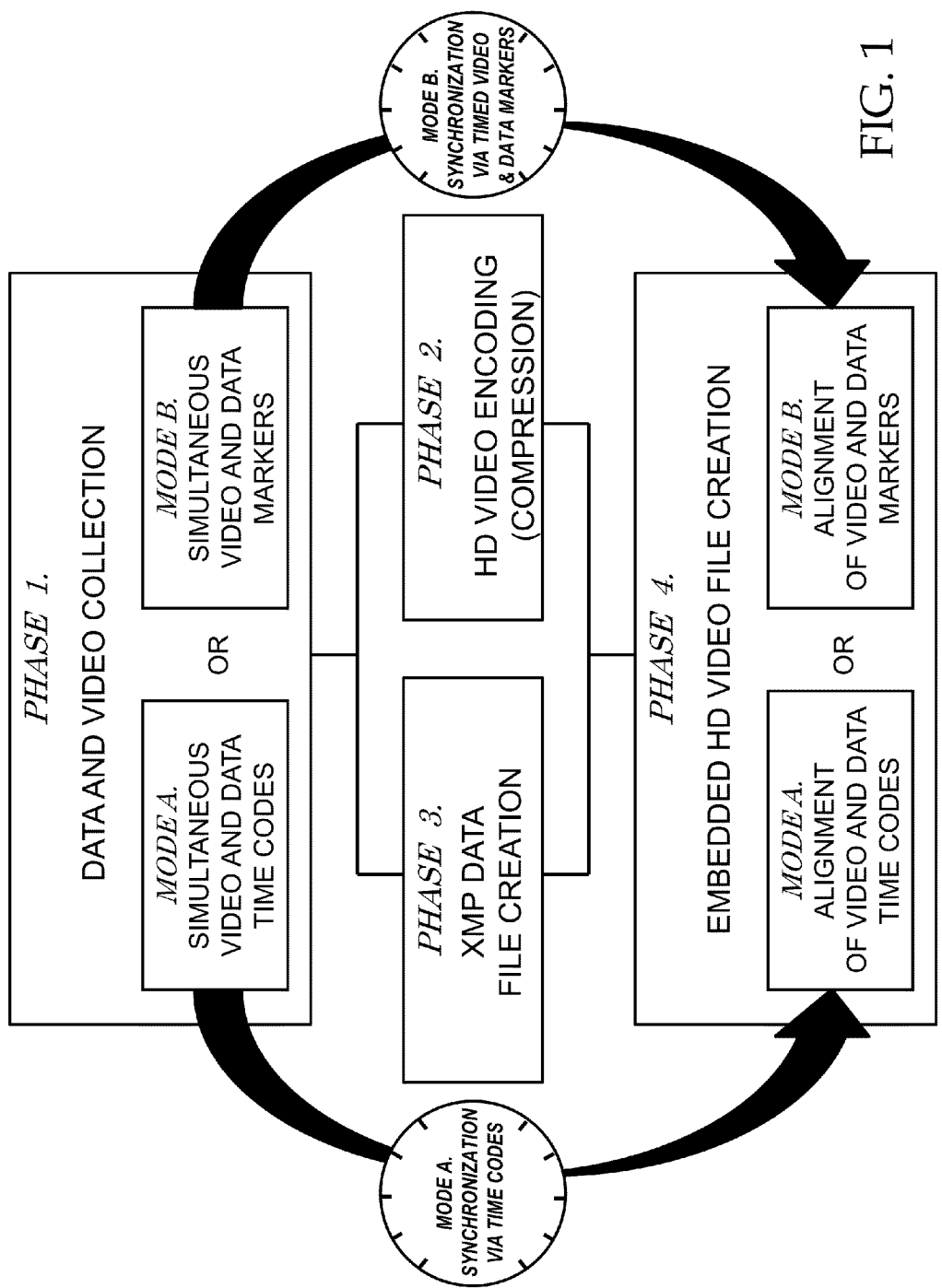
FIG. 1 is a flow diagram of typical practice of an inventive method for synchronously merging video and numerical data.

Referring now to the figures and particularly to FIG. 1, typical embodiments of the present invention provide for four primary phases for creating a video file embedded with numerical (e.g., engineering) data. Firstly, video and numerical data are recorded contemporaneously. Secondly, the video is encoded into a digital HD file. Thirdly, a digital Extensible Metadata Platform (XMP) data file is created using the collected data. Fourthly and finally, the video file and the XMP data file are merged. The second and third phases can occur concurrently or consecutively (in either order), but both phases occur subsequent to the first phase and previous to the fourth phase.

In the first phase, the video data and the numerical data are separately collected. The video data are collected using a video capture device 40. Video capture device (e.g., camera) 40, recording to an HDCAM tape, records video of the test or phenomenon that is being observed. The numerical data are collected using a data acquisition system (unit) 50. Data acquisition system 50 records information collected by sensors 51 connected thereto. Video data are collected simultaneously with the collection of numerical data.

Data acquisition systems are commonly used in engineering practice. Practically any kind of sensor admits of inventive practice; examples of sensors that may be associated with a data acquisition system in inventive practice include but are not limited to linear variable differential transformers (LDVTs), strain gauges, potentiometers, accelerometers, velocimeters, pressure sensors, temperature sensors, light sensors, acoustic sensors, etc.

A key feature of typical inventive practice is the simultaneous pairing of temporal identifiers. Initially, during the first phase, the temporal identifiers are simultaneously input into the data acquisition unit 50 and the camera 40. According to mode "A" inventive practice, the simultaneously provided temporal identifiers are time codes. According to mode "B" inventive practice, the simultaneously provided temporal identifiers are "markers." Other modes of inventive practice of temporal identifiers are possible, such as embodiments combining aspects of modes "A" and "B."

Figure 2:
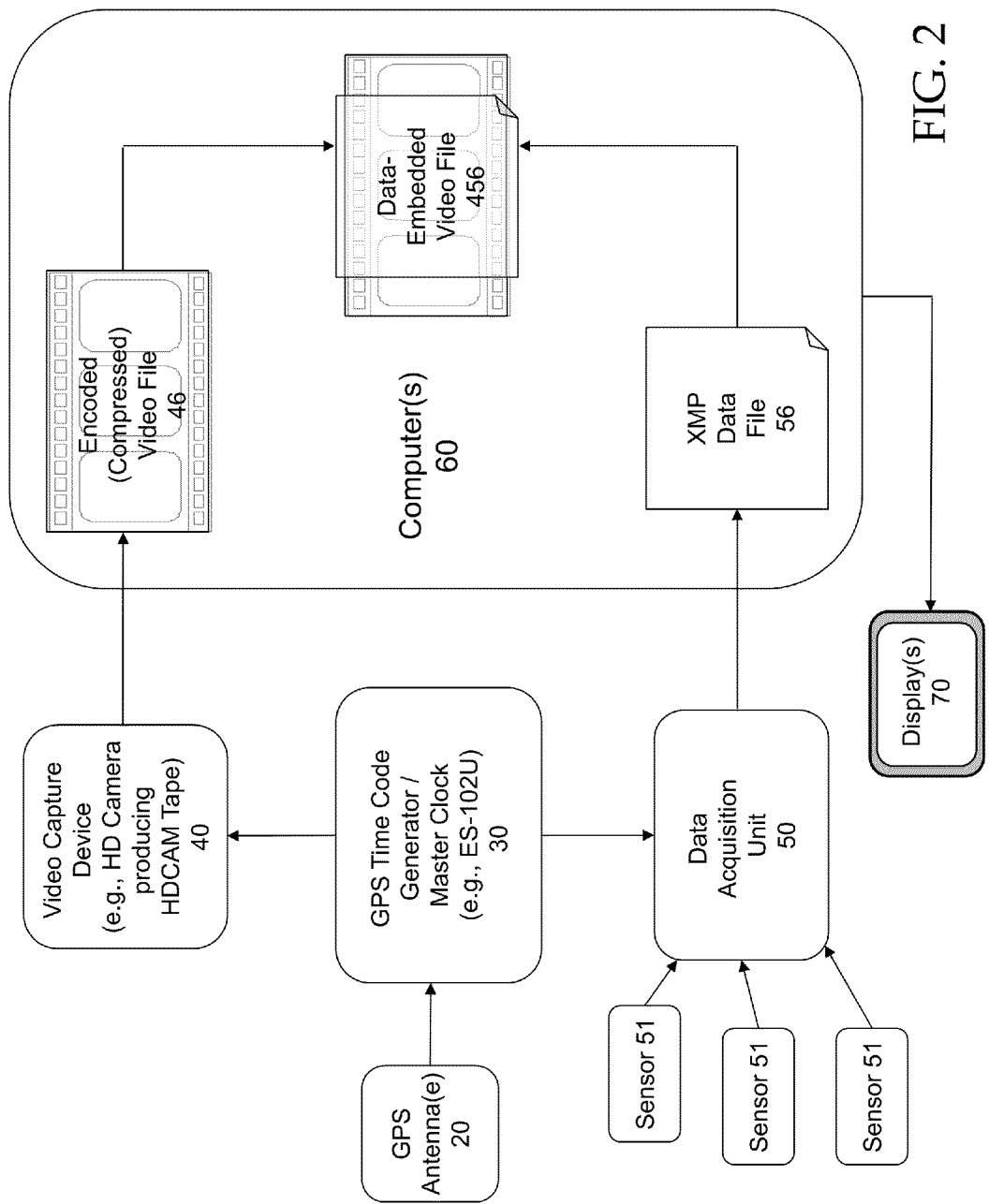
FIG. 2 is a schematic of typical practice of an inventive system for synchronously merging video and numerical data.

Typical mode "A" practice of the present invention is shown in FIG. 2. A common time code signal is read by the data acquisition unit 50 and the video capture device 40. The time code is encoded in the data and is superimposed on the video. One or more iterations of time coding can be performed, depending on the inventive embodiment. Each timecode iteration has a different time code. In each time-code iteration, the same time code is simultaneously associated with the video and the data.

The Global Positioning System (GPS) is availed of in furtherance of time accuracy. A GPS timecode generator 30 is connected to one or more GPS antennas 20, which receive wireless GPS signals. The GPS timecode generation device 30 is used to ensure that events recorded in the video correspond with events recorded in the data. The time code is recorded by both the HDCAM tape device 40 and the data acquisition system 50.

Typical mode "B" practice of the present invention is shown in FIGS. 3 through 6. The "markers" are man-made recognizable events. One recognizable event, video marker 99V, is associated with the videotape 43 while the video data is being collected (e.g., while the video is being taken) by the video capture device (e.g., video camera) 40; video capture device 40 then outputs the marked videotape 43. The other recognizable event, data marker 99D, is associated with the delimited data file 53 while the data is being collected by the data acquisition unit 50; data acquisition unit 50 then outputs the marked delimited data file 53. The two separate markers, viz., video marker 99V and data marker 99D, are different in character but identical in timing. A synchronization trigger 80 is used to simultaneously mark: the video, while it is being produced by the video capture device 40; and, the numerical data, while it is being produced by the data acquisition unit 50.

The inventive markers are visual indicators that can vary with varying inventive embodiments. For instance, the video marker 99V can be in the form of: a superimposed image such as the "X" symbol shown in FIG. 4; or, a light intensity increase such as the light flash shown in FIG. 5; or, an inserted indicator such as the blank frame interposed between two frames in FIG. 6. The data marker 99D can result from, for instance, an analog electrical signal or a digital electronic signal. An example of a numerical data marker 99D suitable for inventive practice is the voltage spike 99D shown in FIGS. 4 through 6.

In furtherance of temporal precision, a synchronization trigger 80 is implemented to simultaneously send both markers. Synchronization trigger 80 sends at least one video marker signal to video capture device 40 and at least one data marker signal to data acquisition device 50. The data marker signal can be either analog or digital, depending on the inventive embodiment. Typical inventive embodiments effect one simultaneous pair of markers 99V and 99D, as this is frequently all that is necessary to align the two simultaneous markers in the phase 4 data merger. Nevertheless, some inventive embodiments provide for plural (e.g., periodic or frequent) effectuations of simultaneous marking by synchronization trigger 80.

Particularly with reference to FIG. 2, FIG. 3, FIG. 7, FIG. 9, and FIG. 10, in phase 2 the marked video file 43 produced by video capture device 40 is converted into a encoded/compressed video file format 46. A video capture device 40 outputs a marked videotape (e.g., HDCAM tape) 43, which in turn is processed by a general-purpose computer 60 or a specialized computer such as a video encoding device 45. Resulting from the processing of marked videotape 43 by computer(s) 60 or video encoding device 45 is an encoded (compressed) video file 46, such as an HD digital video file 46. Insofar as describing a video file 46 in the context of inventive practice, the terms "encoded" and "compressed" are used interchangeably herein.

Figure 12:
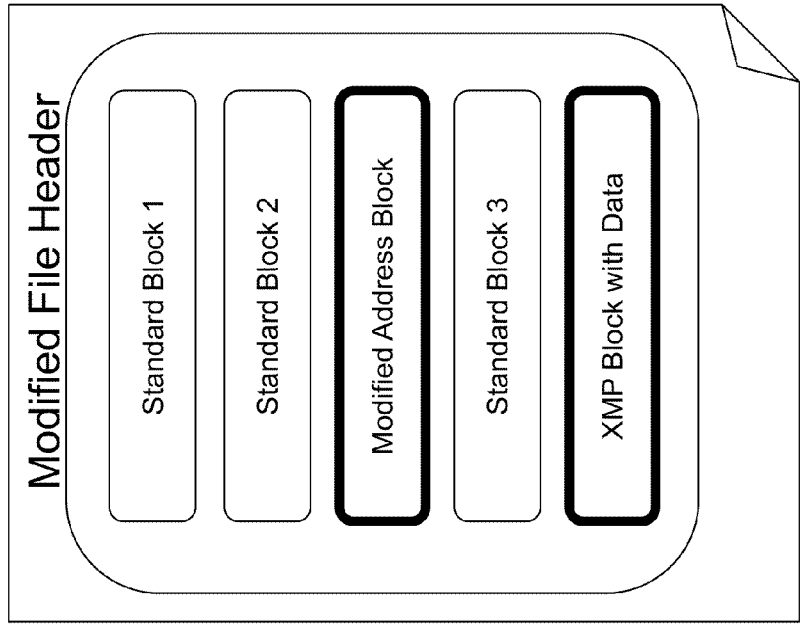
FIG. 11 and FIG. 12 are diagrams of, respectively, an unmodified header of a marked video file (FIG. 11), and a modified version thereof (FIG. 12).
Figure 11:
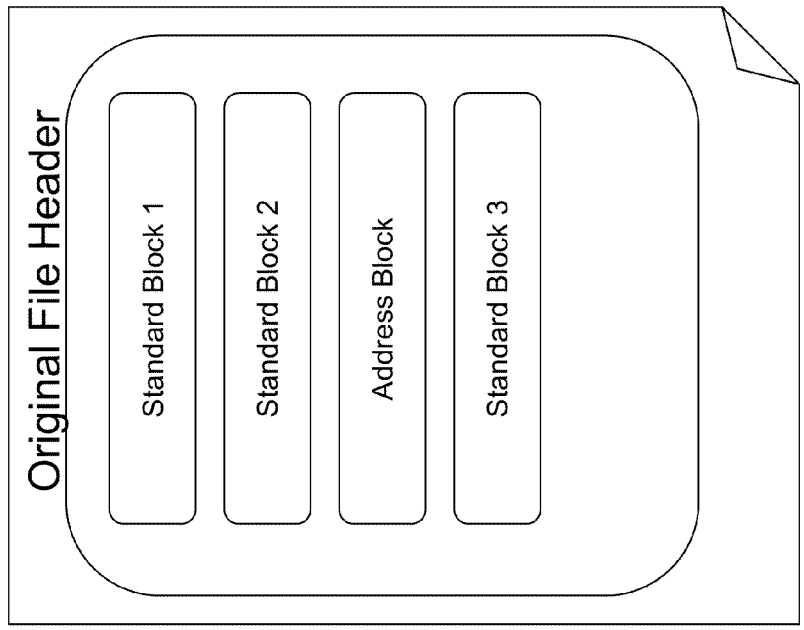

In testing of the present invention, the present inventors used a video encoding device 45 that was manufactured by Digital Rapids and that implemented a STREAMZHD program. The Digital Rapids device 45 was capable of encoding real-time streaming video into a variety of HD file formats. For their application the present inventors used an h.264 file format. FIGS. 11 and 12 are representative of video files 46 that are encoded in h.264. The file header of an h.264 file contains modified address blocks as wells as an additional block with data in XMP format. Another commercially available software program that was used by the present inventors was Adobe's Media Encoder program.

Figure 3:
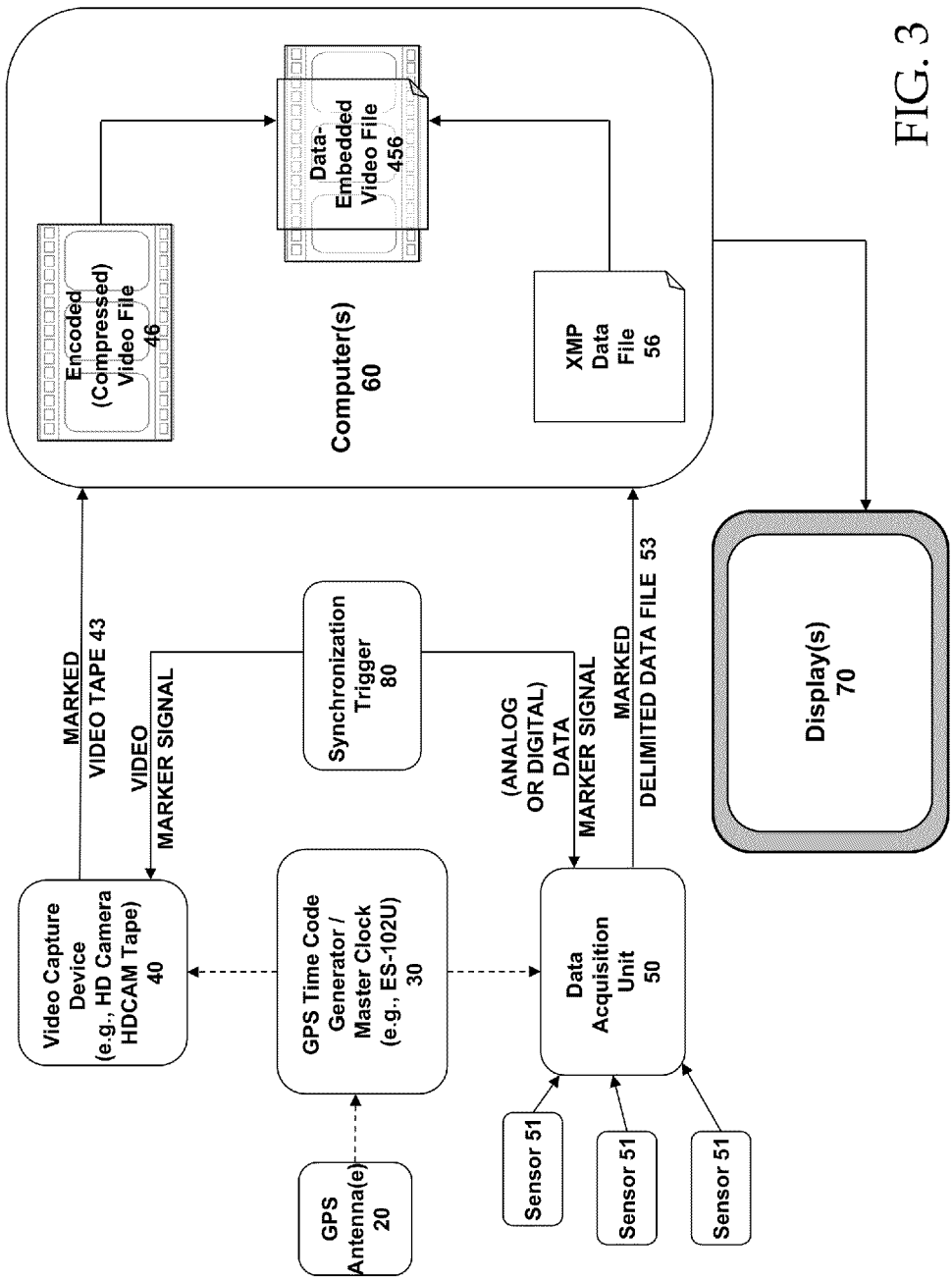
FIG. 3 is a schematic, similar to FIG. 2, of typical practice of an inventive system for synchronously merging video and numerical data.
Figure 10:
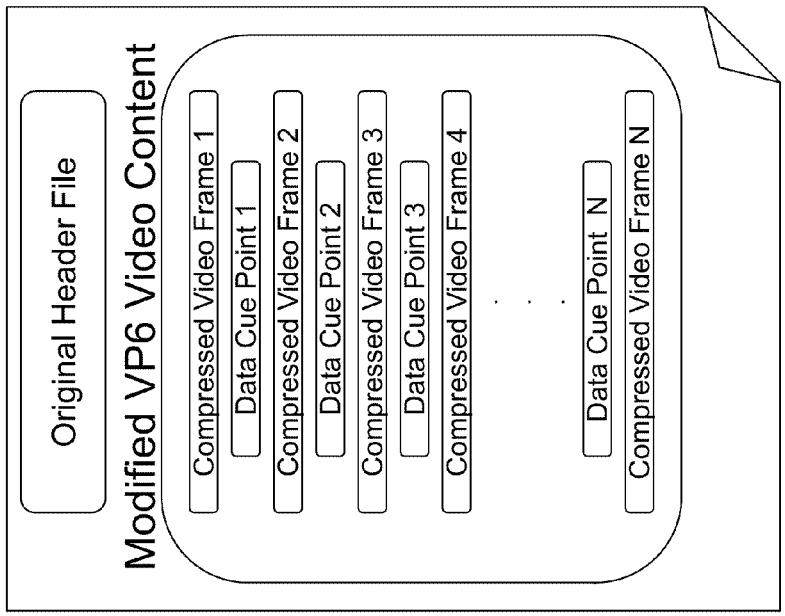
FIG. 9 and FIG. 10 are diagrams of, respectively, an unmodified marked VP6 video data file (FIG. 9), and a modified version thereof (FIG. 10) such as an encoded (compressed) video data file.
Figure 9:
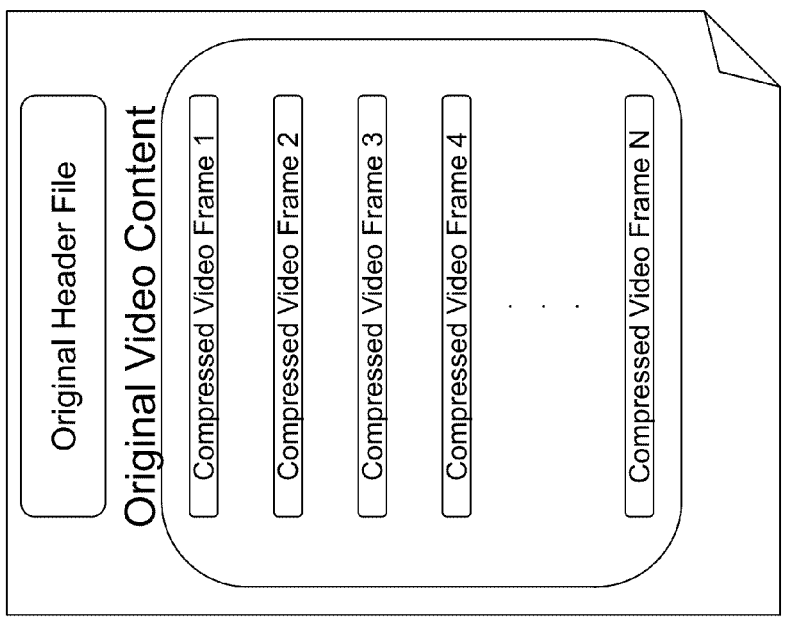
Figure 13:
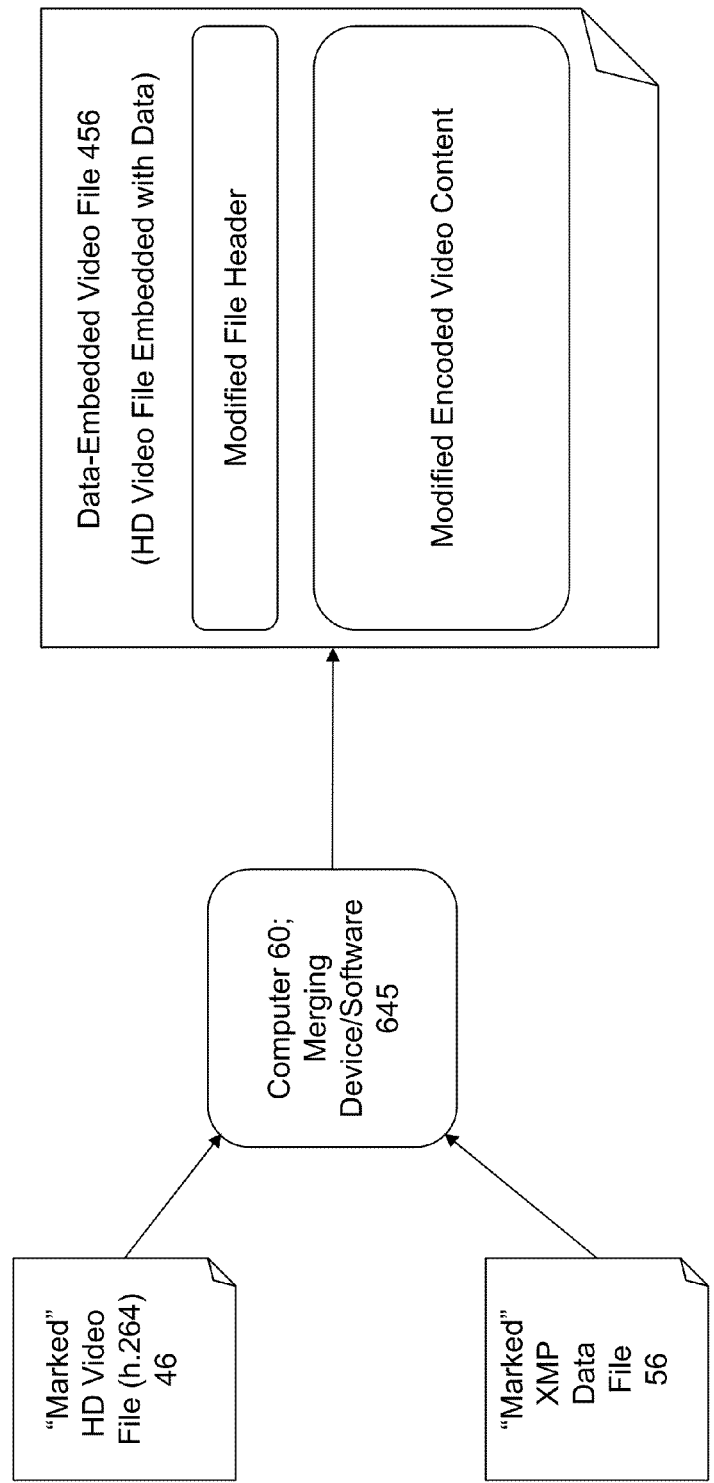
FIG. 13 is a schematic of typical inventive practice of the merger of (i) a suitable modified marked video data file and (ii) a suitably modified marked numerical data file into (iii) a single data file that unites the suitable modified marked video data file and the suitably modified marked numerical data so as to be mutually and synchronously displayable (e.g., playable).

Particularly with reference to FIG. 2, FIG. 3, and FIG. 8, in phase 3 the marked delimited text data file 53 produced by data acquisition unit 50 is converted into an XMP data file format 56. The conversion can be performed by a general-purpose computer 60 or by a specialized computer such as a script-interpreting device 55. In their inventive testing, the present inventors used a custom script written in MATLAB; nevertheless, practically any programming language that can read and write delimited files can be used in inventive practice. As depicted in FIG. 13, the new, data embedded, video file 456, can have both a modified header and modified video content. The new file header has an additional "block" that contains the data, such as test data. All other header blocks that contain address information must be modified to account for this additional block. In the case of the VP6 video format, test data is also inserted between video frames, thus modifying the video content vis-à-vis delimited data file 53. FIGS. 9 and 10 are representative of data files 56 that are encoded in VP6 (Flash). The video content part of the file is modified to contain "cue points," which contain the data values for each engineering channel for the corresponding video frame.

Reference now being made especially to FIGS. 1 through 6, FIG. 13, and FIG. 14, the four main phases of typical inventive practice can be summarized as follows.

In phase 1, video data is collected by a video capture device 40, and numerical data is collected by a data acquisition unit 50. Either a time code (mode "A") or a marker (mode "B") is simultaneously associated with the video data (being collected by a video capture device 40) and the numerical data (being collected by a data acquisition unit 50). A time-coded or marked videotape 43 is output by the video capture device 40.

In phase 2, videotape 43 (which has been time-coded or marked in phase 1) is input into a general-purpose computer 60 or a special-purpose encoding computer 45, where the time-coded/marked videotape 43 is encoded (compressed) to form an encoded/compressed marked video file 46. The encoded/compressed video file 46 is output from the encoding device 60 or 45.

In phase 3, a delimited data file 53 (which has been time-coded or marked in phase 1) is input into a general-purpose computer 60 or a special-purpose script-interpreting computer 55, where the marked delimited data file 53 is converted to a marked XMP data file 56. The marked XMP data file 56 is output from the script-interpreting device 60 or 55.

In phase 4, the encoded/compressed video file 46 and the marked XMP data file 56 are each input into a computer 60, which includes a processor and a memory and data-merging software 645 resident in its memory. Phase 4 is the data alignment-and-merger phase; that is, the data and the video are alignedly merged to form a hybridized digital file, viz., data-embedded video file 456. According to typical inventive practice, the video marker 99V is found manually (i.e., via manual inspection), whereas the data marker 99D is found automatically (i.e., via computer inspection).

Phase 1 is the data-collection-and-earmarking phase; that is, the data and the video are concurrently collected whereby they are simultaneously earmarked to pave the way for phase-4 alignment-and-merger of the data and the video into a data-embedded video file 456. Phase 4 effects a time correlation culminating in the creation of a temporally synchronized data-embedded video file 456, a digital file that can be displayed using computer 60 and display 70. What are referred to herein as mode "A" mode "B" represent two inventive approaches to earmarking and aligning the data and video for synchronization purposes. Other approaches to earmarking and aligning the data and video, such as those combining elements of mode "A" and mode "B," are possible in inventive practice.

According to mode "A" inventive practice, the collected video and data are correspondingly each time-coded in phase 1. In phase 4, the merging software 645 aligns the marked XMP data file 56 and the encoded video file 46 by matching the time code written in the data file 56 and the time code superimposed on the video file 46.

Figure 4:
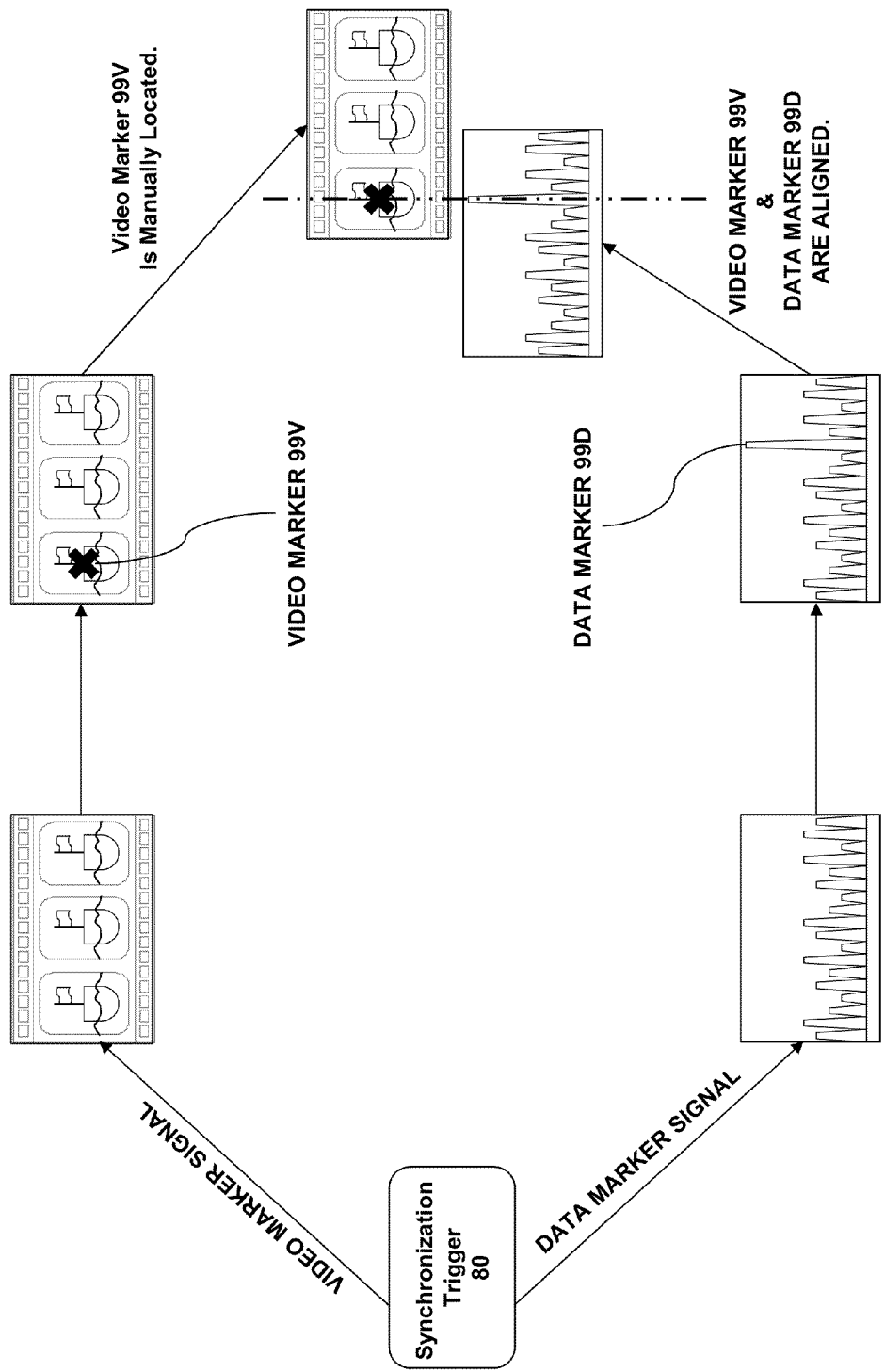
FIG. 4, FIG. 5, and FIG. 6 are similar diagrammatic representations of typical variations of inventive practice of "B"-mode synchronization of video and numerical data. Each of FIGS. 4 through 6 illustrates the simultaneous marking of video and numerical data, and the alignment of the respective markers upon merger of the video and numerical data.
Figure 5:
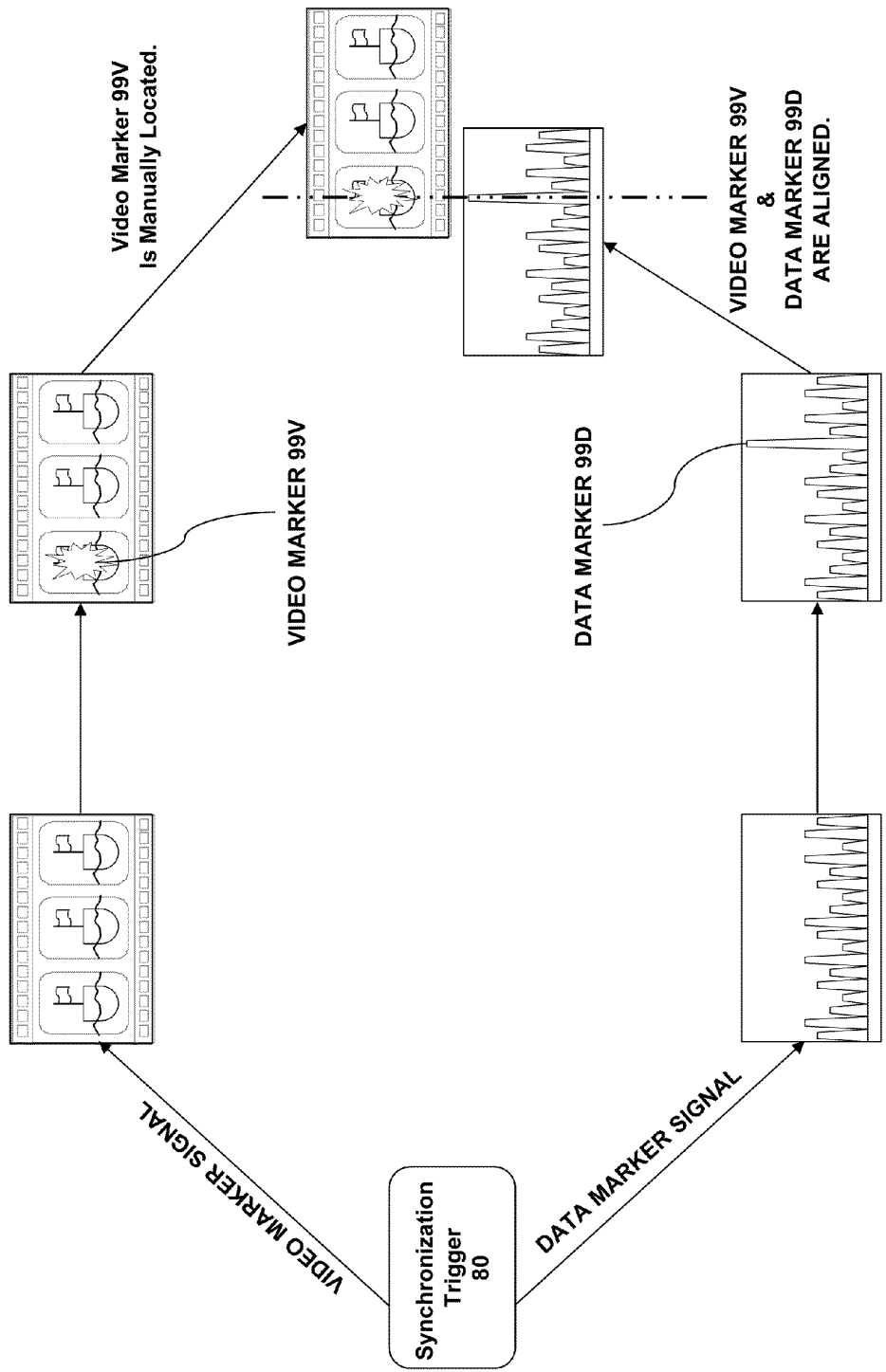
Figure 6:
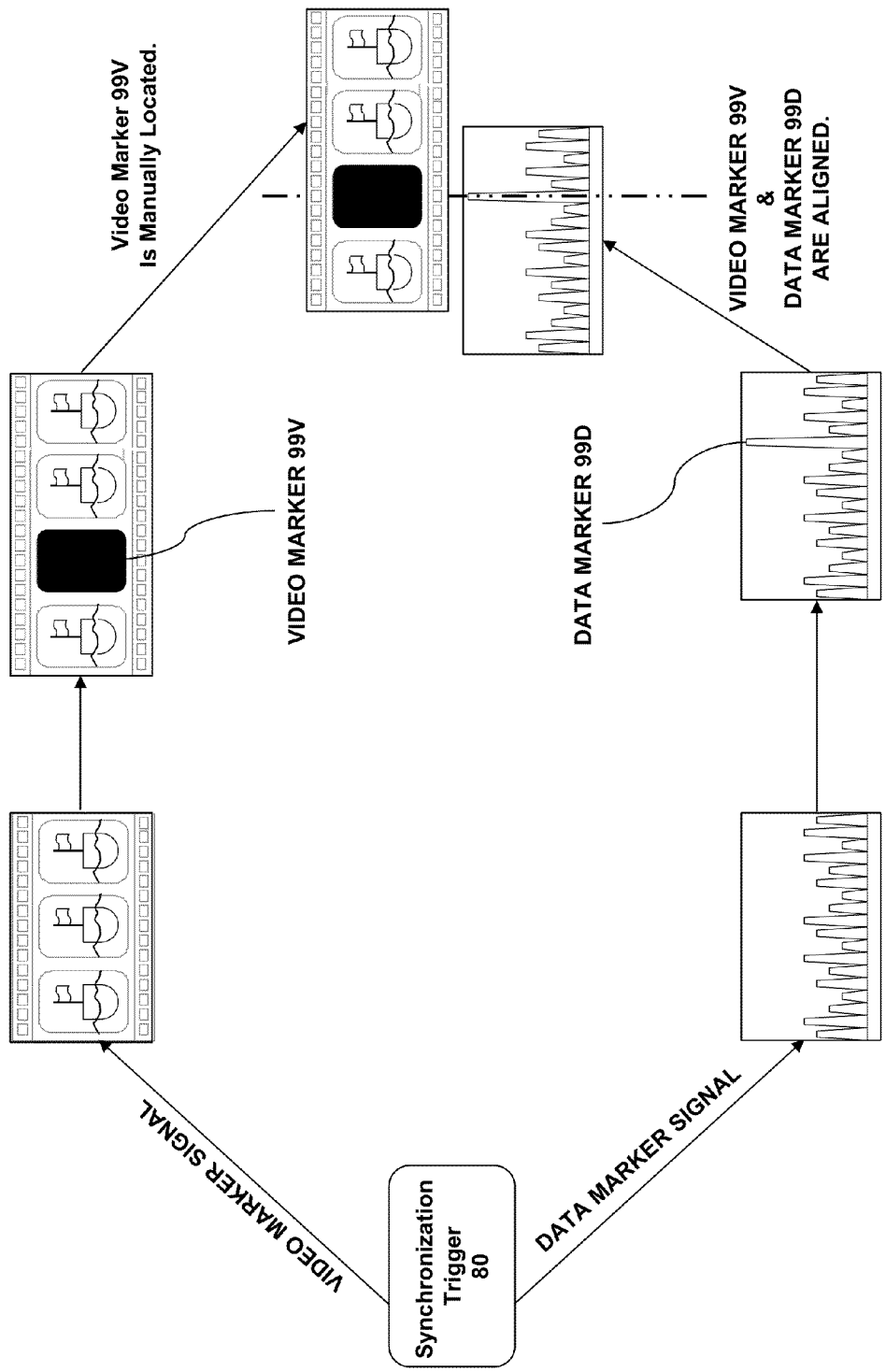
Figure 7:
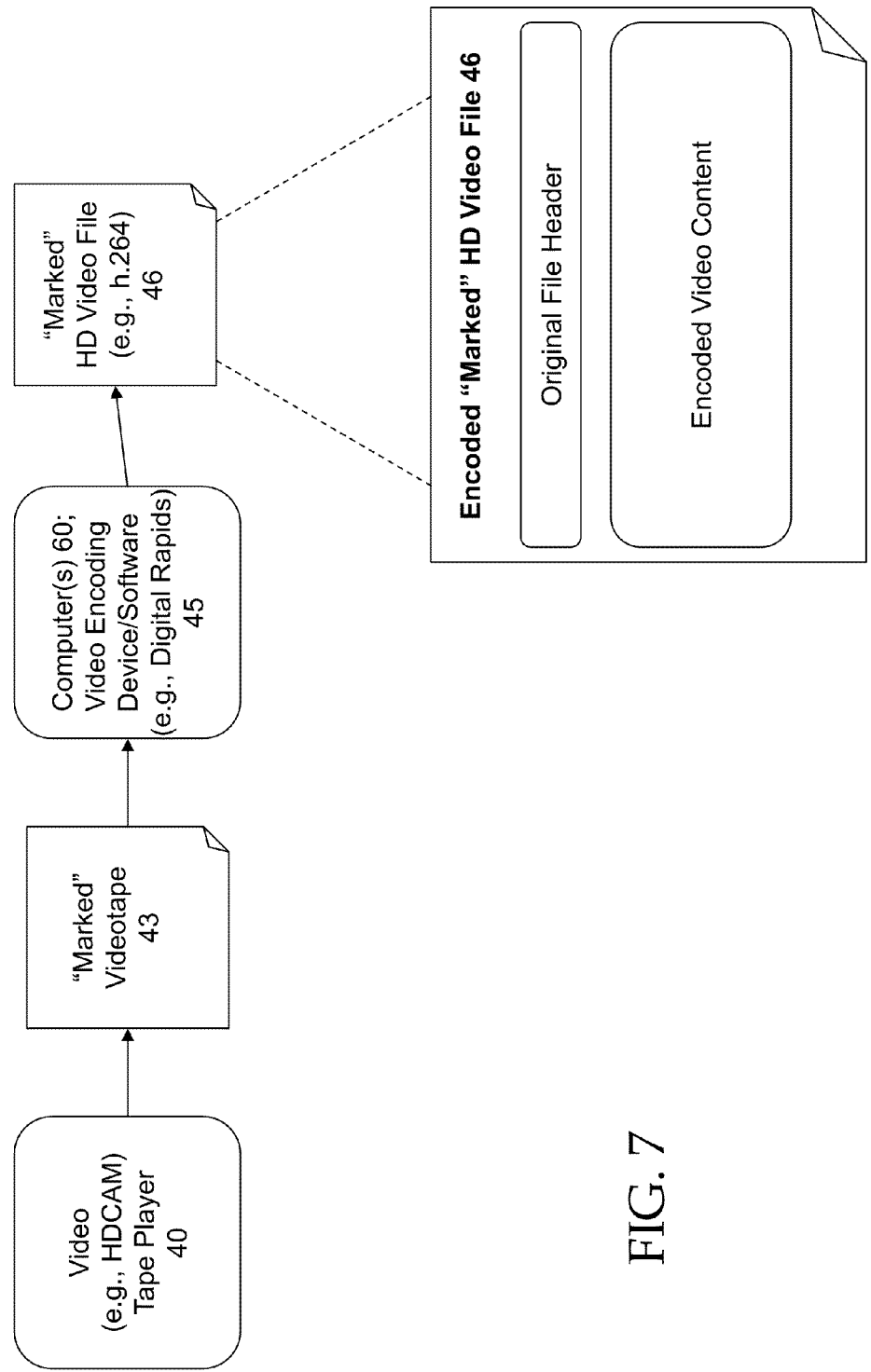
FIG. 7 is a schematic of typical inventive practice of the modification of a marked video data file, output by a video camera/player, to a marked video data file suitable for inventive union with a marked data file.

According to mode "B" inventive practice, examples of which are illustrated in FIGS. 4 through 6, the collected video and data simultaneously are each marked in phase 1. In phase 4, the merging software 645 performs an alignment of the marked XMP data file 56 and the encoded video file 46 that is based on the respective positions of the video marker 99V and the data marker 99D. Markers 99V and 99D are positionally aligned and are thus simultaneously paired.

As typically practiced, the present invention affords: integrated high definition video and high bitrate data visualization in a single environment; network (e.g., internet or intranet) compatibility; multiple channel display of numerical (e.g., engineering) information; exportation of screenshots of still video frames directly to image files or MS Word tables; customizable renderings of numerical (e.g., engineering) data including but not limited to x-y charts, multiple axes, numerical readouts, and bar readouts; playback; frame stepping; direct frame access control; zoom control; loading and saving of configurable layouts.

Data-embedded video file 456, such as shown in FIG. 13, is typically an HD video file containing embedded numerical data. Inventive playback of data-embedded video file 456 usually requires implementation by the inventive practitioner of a suitable computer program for residence in computer 60's memory and execution by computer 60's processor, thereby effectuating display of the data-embedded video file 456 by a computer display 70.

In their inventive testing, the present inventors produced a custom video file playback application prototype, written in Adobe ActionScript 3, to interpret data-embedded video file 456. Adobe ActionScript is an open-source object-oriented language, used especially for developing websites and software intended for the Adobe Flash Player platform. Adobe ActionScript 3 is capable of reading both header blocks of h.264 video files and data cue points of VP6 video files. Interpretation by the present inventors' prototypical application of h.264 video files requires the additional step of creating "action-script cue points" that are a functionally inferior replacement for embedded cue points. Each cue point has twelve channels of data values, and a time point in the video. A "channel" of data, in the context of typical inventive practice, is information recorded by a single sensor 51 of the data acquisition system 50.

As the video is played and cue point times are reached, the inventive software renders the data visually in various forms of user-specified readouts 57. FIG. 14, which shows a screenshot 71 displayed on a computer display 70, is representative of the layout configuration and readout capabilities of the inventive software. The screenshot 71 of data-embedded video file 456 includes displayed video 47 and displayed numerical data 57. These numerical data readouts 57 include numerical digital displays and time series plots such as shown in FIG. 14. The inventors considered or rendered other types of readouts that are not shown in FIG. 14, such as an instantaneous gauge (e.g., an automobile speedometer). The skilled artisan who reads the instant disclosure will appreciate that diverse types of readouts are possible in inventive practice.

The size, position, and playback speed of the data-embedded video 456 are controlled by interactive buttons. Video can be selected by the user from a table, in the form of a playlist. Users can select a specific point in time in the video sequence to be played back. These points can be accessed by entering a specific time code. Data is rendered in real time in the readouts 57, as selected by the user. Context menus permit changing the features of the readouts such as scale, color, and shape. Standard mouse movements permit the user to position and reshape the readouts to his/her preference.

An additional function of the inventive software prototype is the ability for users to save sequences of video still images. The sequences of images can also be imported directly into an MS Word table. The user can define a point in time in the video, the number of images to capture, and the time between each image. Furthermore, the layout configuration lends itself to customization. Users can share information by configuring and saving customized readout configuration files. A small configuration file can be sent to other users of the software so that they may observe the same phenomenon.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A method for synchronously fusing video data and numerical data, the method comprising:

collecting video data, said collecting of said video data including using a video camera and using a video capture device, said video camera used to obtain video information, said video capture device used to record said video information obtained by said video camera;

collecting numerical data, said collecting of said numerical data including using at least one sensor and using a data acquisition unit, said at least one sensor used to obtain sensory information, said data acquisition unit used to record said sensory information obtained by said at least one sensor;

associating a video temporal identifier with said video data;

associating a data temporal identifier with said numerical data;

converting said video data to an encoded video file, said encoded video file having said video temporal identifier associated therewith;

converting said numerical data to a marked XMP data file, said marked XMP data file having said data temporal identifier associated therewith;

merging said encoded video file and said marked XMP data file, said merger including aligning said video temporal identifier and said data temporal identifier, said video temporal identifier associated with said encoded video file, said data temporal identifier associated with said marked XMP data file;

wherein said video camera and said at least one sensor differ from each other;

wherein said video information and said sensory information differ from each other;

wherein said collecting of said video data and said collecting of said numerical data are performed concurrently; and wherein said associating of said video temporal identifier and said associating of said data temporal identifier are performed simultaneously during said collecting of said video data and said collecting of said numerical data.

2. The method for synchronously fusing of claim 1, wherein said merger results in a fused data file characterized by synchronicity of said video data and said numerical data.

3. The method for synchronously fusing of claim 1, wherein said merger of said encoded video file and said marked XMP data file includes using a computer.

4. The method for synchronously fusing of claim 1, wherein said association of said video temporal identifier with said video data includes using a timing device, wherein said association of said data temporal identifier with said numerical data includes using said timing device, and wherein said timing device facilitates said simultaneous performance of said association of said video temporal identifier with said video data and said association of said data temporal identifier with said numerical data.

5. The method for synchronously fusing of claim 4, wherein said timing device includes a time code generator, and wherein said simultaneous association includes simultaneously time coding said video data and said numerical data, said video temporal identifier being video time coding, said data temporal identifier being data time coding.

6. The method for synchronously fusing of claim 5, wherein said merger of said encoded video file and said marked XMP data file includes using a computer, and wherein said alignment of said video temporal identifier and said data temporal identifier includes using said computer so as to match said video time coding and said data time coding.

7. The method for synchronously fusing of claim 4, wherein:
said timing device includes a synchronization trigger;
said association of said video temporal identifier with said video data includes sending a video marking signal to said video data;
said association of said data temporal identifier with said numerical data includes sending a data marker signal to said numerical data;
said sending of said video marking signal to said video data and said sending of said data marker signal to said numerical data are performed simultaneously;
said video temporal identifier is a video marker;
said data temporal identifier is a data marker.

8. The method for synchronously fusing of claim 7, wherein said merger of said encoded video file and said marked XMP data file includes using a computer, and wherein said alignment of said video temporal identifier and said data temporal identifier includes using said computer so as to positionally align said video marker and said data marker.

9. The method for synchronously fusing of claim 8, wherein said encoded video file is characterized by plural frames, and wherein said video marker is a light manifestation in a said frame.

10. The method for synchronously fusing of claim 8, wherein said encoded video file is characterized by plural frames, and wherein said video marker is a superimposed symbol in a said frame.

11. The method for synchronously fusing of claim 8, wherein said encoded video file is characterized by plural frames, and wherein said video marker is an extra said frame introduced between two existing said frames.

12. The method for synchronously fusing of claim 8, wherein said data marker is a distinct electrical manifestation in said marked XMP data file.

13. The method for synchronously fusing of claim 12, wherein said distinct electrical manifestation is a voltage signal spike.

14. The method for synchronously fusing of claim 12, wherein said encoded video file is characterized by plural frames, and wherein said video marker is selected from the group consisting of:
a light manifestation in a said frame;
a superimposed symbol in a said frame;
an extra said frame introduced between two existing said frames.

15. A data fusion method comprising:
concurrently collecting video sensory data and non-video sensory data in real time with respect to an occurrence, said collecting of said video sensory data including performing video sensing with respect to said occurrence and acquiring video sensory information based on said video sensing with respect to said occurrence, said collecting of said non-video sensory data including performing non-video sensing with respect to said occurrence and acquiring non-video sensory information based on said non-video sensing with respect to said occurrence;
simultaneously marking said video sensory data and said non-video sensory data during said concurrent collection of said video sensory data and said non-video sensory data;
modifying the marked said video sensory data and the marked said non-video sensory data to facilitate computer-implemented combination of the marked said video sensory data and the marked said non-video sensory data; and
combining, using a computer, the modified marked said video sensory data and the modified marked said non-video sensory data, the modified marked said video sensory data being marked with a video data marker, the modified marked said non-video sensory data being marked with a non-video data marker, said combining including aligning said video data marker and said non-video data marker.

16. The data fusion method of claim 15, wherein:
the modified marked said video sensory data is embodied as an encoded video file;
the modified marked said non-video sensory data is embodied as a marked XMP data file;
said combining yields a fused data file constituting a fusion of said encoded video file and said marked XMP data file, said aligning of said video data marker and said non-video data marker imparting a synchronous character to said fused data file in terms of synchronicity of said video sensory data and said non-video sensory data.

17. A system for synchronously fusing video data and numerical data, the system comprising:
a video capture device for collecting video data from a first source of sensory data;
a data acquisition device for collecting numerical data from a second source of sensory data, said numerical data differing from said video data, said second source of sensory data differing from said first source of sensory data;
a simultaneous signaling device for simultaneously transmitting a pair of signals during concurrency of said collection of said video data and said collection of said numerical data, the first said signal being received by said video capture device and producing a first marker, the second said signal being received by said video capture device and producing a second marker, said first marker marking said video data, said second marker marking said numerical data;
computer apparatus configured to execute computer program logic that, when executed, is capable of fusing said video data and said numerical data, wherein according to said computer program logic:
the marked said video data is converted to a digital video data form, said digital video data form having said first marker;
the marked said numerical data is converted to a digital numerical data form, said digital numerical data form having said second marker;
said digital video data form and said digital numerical data form are merged so as to align said first marker and said second marker, said merger thereby forming a digital fused data form characterized by synchronicity of said video data and said numerical data.

18. The system for synchronously fusing of claim 17, wherein:
said digital video data form is an encoded video file;
said digital numerical data form is a marked XMP data file;
said digital fused data form is a fused data file, said fused data file representing a fusion of said encoded video file and said marked XMP data file.

19. The system for synchronously fusing of claim 17, the system further comprising a computer display, wherein according to said computer program logic said digital fused data form is displayable on said computer display so as to manifest said synchronicity of said video data and said numerical data.

20. The method for synchronously fusing of claim 1, wherein said collecting of said video data and said collecting of said numerical data are concurrently performed in real time with respect to real-time occurrence.

\* \* \* \* \*